US010943207B2

(12) United States Patent
Taylor et al.

(10) Patent No.: US 10,943,207 B2
(45) Date of Patent: Mar. 9, 2021

(54) SHIPMENT RECEIVING SYSTEMS AND METHODS INCLUDING NOTIFICATION AND RECONCILIATION FEATURES

(71) Applicant: Walmart Apollo, LLC, Bentonville, AR (US)

(72) Inventors: Robert James Taylor, Rogers, AR (US); Jason Bellar, Bella Vista, AR (US); John Crecelius, Springdale, AR (US); Matthew David Alexander, Rogers, AR (US); William M. Propes, Bentonville, AR (US); Jesse Berry, Centerton, AR (US); Jeffrey Scott Cruz, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 442 days.

(21) Appl. No.: 15/910,174

(22) Filed: Mar. 2, 2018

(65) Prior Publication Data
US 2018/0253683 A1 Sep. 6, 2018

Related U.S. Application Data

(60) Provisional application No. 62/466,085, filed on Mar. 2, 2017.

(51) Int. Cl.
*G06Q 10/08* (2012.01)
*G06Q 50/28* (2012.01)
(Continued)

(52) U.S. Cl.
CPC ......... *G06Q 10/087* (2013.01); *B65G 47/485* (2013.01); *B65G 47/503* (2013.01);
(Continued)

(58) Field of Classification Search
CPC ....... G06Q 10/087; G06Q 10/10; G06Q 50/28
(Continued)

(56) References Cited

U.S. PATENT DOCUMENTS 3,628,632 A 12/1971 Lambert
4,832,204 A 5/1989 Handy
(Continued)

FOREIGN PATENT DOCUMENTS

GB 1571270 A 7/1980

OTHER PUBLICATIONS

International Search Report and Written Opinion, Application No. PCT/US2018/020574, dated May 18, 2018, 7 pages.
(Continued)

*Primary Examiner* — Florian M Zeender
*Assistant Examiner* — Christopher R Buchanan
(74) *Attorney, Agent, or Firm* — Patterson Thuente Pedersen, P.A.

(57) ABSTRACT

Shipment receiving systems and methods are disclosed. Invoice and store inventory management data is provided to an invoice processor for assigning expected destinations to lanes of a material transporter having and a plurality of outlet lanes that each have an indicator. A scanner determines a case identifier for each case which is routed accordingly. One or more notifications is provided to the indicator of one or more of the plurality of outlet lanes. Received shipment data enables reconciliation of upstream supply change management systems and downstream store inventory systems.

25 Claims, 11 Drawing Sheets

(51) Int. Cl.
  *G06Q 10/10* (2012.01)
  *B65G 47/50* (2006.01)
  *B65G 47/48* (2006.01)

(52) U.S. Cl.
  CPC .............. *G06Q 10/10* (2013.01); *G06Q 50/28* (2013.01); *B65G 2201/02* (2013.01); *B65G 2203/0216* (2013.01); *B65G 2203/044* (2013.01)

(58) Field of Classification Search
  USPC ....................................................... 705/28, 22
  See application file for complete search history.

(56) References Cited

U.S. PATENT DOCUMENTS

| | | | |
|---|---|---|---|
| 5,131,499 | A | 7/1992 | Hoar |
| 5,213,145 | A | 5/1993 | Huang |
| 5,285,887 | A | 2/1994 | Hall |
| 5,551,531 | A | 9/1996 | Dumont |
| 6,253,906 | B1 | 7/2001 | Hall |
| 6,315,104 | B1 | 11/2001 | Ebert |
| 6,460,683 | B1 | 10/2002 | Pfeiffer |
| 6,550,583 | B1 | 4/2003 | Brenhouse |
| 6,502,707 | B1 | 7/2003 | Sullivan |
| 6,793,043 | B2 | 9/2004 | Nguyen |
| 6,848,567 | B2 | 2/2005 | Kilper |
| 7,072,737 | B2 | 7/2006 | Lunak |
| 7,114,615 | B1 | 10/2006 | Karpy |
| 7,331,471 | B1 | 2/2008 | Shakes |
| 7,542,823 | B2 | 6/2009 | Nagai |
| 7,938,060 | B2 | 5/2011 | Manak |
| 7,984,809 | B1 | 7/2011 | Ramey |
| 8,028,817 | B2 | 10/2011 | Itoh |
| 8,575,507 | B2 | 11/2013 | Pippin |
| 8,855,806 | B2 | 10/2014 | Hara |
| 9,101,232 | B1 | 8/2015 | Newman |
| 9,233,799 | B1 | 1/2016 | Mishra |
| 9,486,926 | B2 * | 11/2016 | Kawano ............... G06Q 10/087 |
| 9,733,633 | B2 * | 8/2017 | Wickham ............... G05B 15/02 |
| 9,751,693 | B1 * | 9/2017 | Battles ................. G06Q 10/087 |
| 10,384,872 | B2 * | 8/2019 | Wicks ................. G06Q 10/087 |
| 2003/0079443 | A1 * | 5/2003 | Lindsey, III ......... G03D 15/005 53/442 |
| 2004/0004119 | A1 * | 1/2004 | Baldassari ............. G06Q 10/08 235/384 |
| 2004/0129537 | A1 | 7/2004 | Belz |
| 2004/0168893 | A1 | 9/2004 | Brixius |
| 2006/0095373 | A1 | 5/2006 | Venkatasubramanien |
| 2009/0057403 | A1 | 3/2009 | Marks |
| 2009/0090584 | A1 | 4/2009 | Chakra |
| 2011/0266092 | A1 | 11/2011 | Marquis et al. |
| 2011/0288896 | A1 | 11/2011 | Dewey |
| 2012/0241464 | A1 | 9/2012 | Adams |
| 2014/0032427 | A1 | 1/2014 | Gannon |
| 2014/0279272 | A1 | 9/2014 | Inman |
| 2014/0350717 | A1 | 11/2014 | Dagle |
| 2016/0185532 | A1 | 6/2016 | Danelski |
| 2016/0221768 | A1 | 8/2016 | Kadaba |
| 2017/0043953 | A1 * | 2/2017 | Battles ................. G06Q 10/087 |
| 2017/0154290 | A1 * | 6/2017 | Nomoto ................. G06Q 50/04 |
| 2018/0222620 | A1 | 8/2018 | Lewis |
| 2018/0251318 | A1 | 9/2018 | Taylor |

OTHER PUBLICATIONS

International Search Report and Written Opinion, Application No. PCT/US2018/020576, dated May 30, 2018, 9 pages.

YouTube, *Taxipost: Automated Parcels Sorting—English*, published on Sep. 30, 2009 and as viewed on Nov. 19, 2018, at https://www.youtube.com/watch?v=vN9XRIAys38, 3 pages.

YouTube, *Viscon Logistics—Sorting Systems*, Published on Sep. 18, 2014 and viewed on Nov. 19, 2018 at https://www.youtube.com/watch?v=O00gDoGXN98, 17 pages.

International Search Report and Written Opinion, Application No. PCT/US18/15398, dated Mar. 29, 2018, 11 pages.

Application and File History for U.S. Appl. No. 15/910,168, filed Mar. 2, 2018, Inventor: Taylor et al.

* cited by examiner

SHIPMENT RECEIVING SYSTEMS AND METHODS INCLUDING NOTIFICATION AND RECONCILIATION FEATURES

CROSS-REFERENCE TO RELATED APPLICATION

The present application claims the benefit of U.S. Provisional Application No. 62/466,085 filed Mar. 2, 2017, which is hereby incorporated herein in its entirety by reference.

TECHNICAL FIELD

Embodiments of the present disclosure relate generally to the field of supply chain management systems. In particular, systems and methods for the routing of received shipments.

BACKGROUND

Retail stores and warehouses receive often receive multiple shipments of products each day. While some receiving locations can accommodate shipments via boat, airplane, or rail, shipments generally arrive via truck or other road-based vehicle. Particularly in retail environments, any given shipment may contain a heterogeneous mix of goods, which need to be routed to a variety of destinations within a store. For example, a single shipment may contain baseball bats and footballs, to be routed to a sporting goods aisle, as well as children's clothing and also electronics. In addition, certain products within a shipment may be immediately required to fill empty shelves, while others may need to be sent to an overstock or storage location to prepare for a future need or to a customer order fulfillment area or facility.

Conventionally, unloading and sorting delivered shipments can be a manual and non-standardized process. In some instances, a receiving manager can prepare for a shipment based on an invoice detailing the contents of the shipment. This can allow the preparation of a load map, wherein carts or pallets for the various destinations can be arranged around the receiving area. When the shipment arrives, however, the cases of product are often loaded onto a conveyor and manually pushed downstream. Unloaders remove cases randomly from the conveyor and seek out an appropriate cart or pallet. This manual process can require multiple people (e.g., five to eight, or more) to unload about 2,500 cases per truck.

While most received shipments include the expected goods, as detailed in the invoice, shipping manifest, or packing list, errors can still exist. If not detected at the time of receiving the shipment, these errors may go undetected until a manual count of store inventory (compared to store sales) is performed. In large retail operations, full inventory counts can frequently be infeasible. In addition, even when counts are performed it can be difficult to determine the true source of any discrepancy, as inventory can be affected by shrinkage, spoilage, point-of-sale errors, or other inaccuracies in addition to shipping errors.

Discrepancies between expected and received goods can also necessitate updates to upstream supply chain systems. For example, invoices may need to be corrected before payment or other transfer of ownership is finalized. In addition, early discovery of discrepancies can enable more thorough root cause analysis. Therefore, it can be beneficial to update store inventory databases and other supply chain systems at the time of shipment receipt. Conventional manual methods even further slow the process of receiving a shipment, however.

Inefficiencies in this process can lead to a number of issues. Because shipments can take so long to be sorted, products may sit in receiving for hours while shelves are empty. In addition, in some cases a store inventory system may be updated according to the expected contents of the shipment, based only on the arrival of the shipment. Therefore, the store inventory system may list items as being in stock when they are still in receiving or have not arrived at all due to errors in the upstream supply chain. Also, the repeated lifting and moving of product can result in increased workplace injuries.

Accordingly, what is needed in the industry are systems and methods enabling efficient sorting and routing of the contents of received shipments that reduce the lifting and movement of product by unloaders and automatically update upstream and downstream systems based on the actual received goods.

SUMMARY

Embodiments of the present disclosure meet the need of the industry for systems and methods enabling efficient sorting and routing of shipments, minimizing work performed by unloaders and automating the reconciliation of upstream and downstream supply chain systems.

In one embodiment, a shipment receiving system is provided for managing routing of one or more received cases of a variety of product types from a shipment to one or more destinations within a receiving location such as a store. The shipment receiving system includes a material transporter, a notification engine, an invoice processor, a scanner, and a sorting engine. The material transporter has at least one inlet pathway and a plurality of outlet lanes that each has an indicator. The notification engine is configured to provide notifications to the indicator of one or more of the plurality of outlet lanes. The invoice processor is configured to receive invoice data including the product type of each of the one or more expected cases, receive current inventory management data including a quantity and location of items of each product type in the invoice data, receive marketing data for each product type in the invoice data, determine an expected destination of each one of the expected cases based on the invoice data, the current inventory management data, and the marketing data, assign one or more of the plurality of lanes to each expected destination based on the number of expected cases with the expected destination, and store a receiving plan for the shipment including the one or more lanes assigned to each expected destination.

In embodiments, the scanner is configured to determine a case identifier of each individual one of the one or more received cases, and provide it to the sorting engine. The sorting engine stores a receipt indication for the received case, determines the destination of the received case, assigns the received case to one of the one or more lanes assigned to the destination of the received case, directs the material transporter to route the received case to the lane assigned to the received case, and directs the notification engine to provide a notification to the lane assigned to the received case that provides information regarding the received case to an unloader.

In embodiments, the shipment receiving system can include an inventory and a supply chain reconciler, configured to update respective downstream and upstream data stores based on the received items.

In embodiments, the indicators can provide visual notifications via display screens, lighting elements, or projections. In embodiments the indicators can provide aural indications via direction speakers, loudspeakers, or headphones. In embodiments, each lane can be assigned one or more bins for each assigned destination. In embodiments, each bin can be labeled with a destination. In embodiments, the labels can be display screens that are automatically updated.

In embodiments, each destination can be a critical stock location, standard stock location, feature storage location, or a triage location. In embodiments, cases can be assigned to destinations based on a priority of the destination, where critical stock locations are higher priority than standard stock locations, which are higher priority than feature or storage stock locations. In embodiments, cases that cannot be identified can be routed to a triage location.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
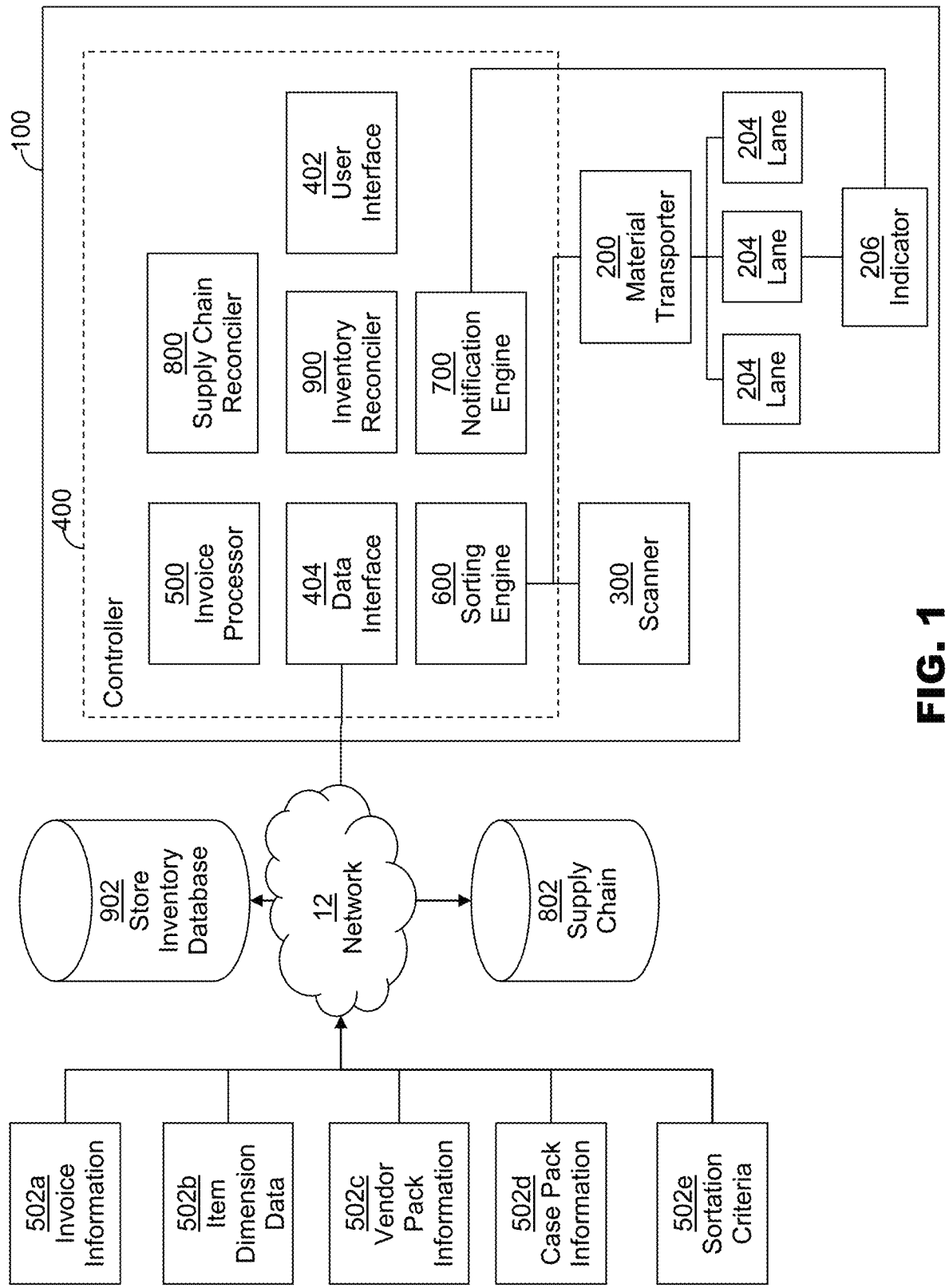
FIG. 1 is a schematic diagram depicting components of a shipment receiving system, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

FIG. 1 is a schematic diagram depicting components of a shipment receiving system 100, according to an embodiment. In embodiments, shipment receiving system 100 includes material transporter 200, scanner 300, and controller 400. In embodiments, controller 400 can comprise numerous engines including user interface 402, data interface 404, invoice processor 500, sorting engine 600, notification engine 700, supply chain reconciler 800, and inventory reconciler 900.

Figure 2:
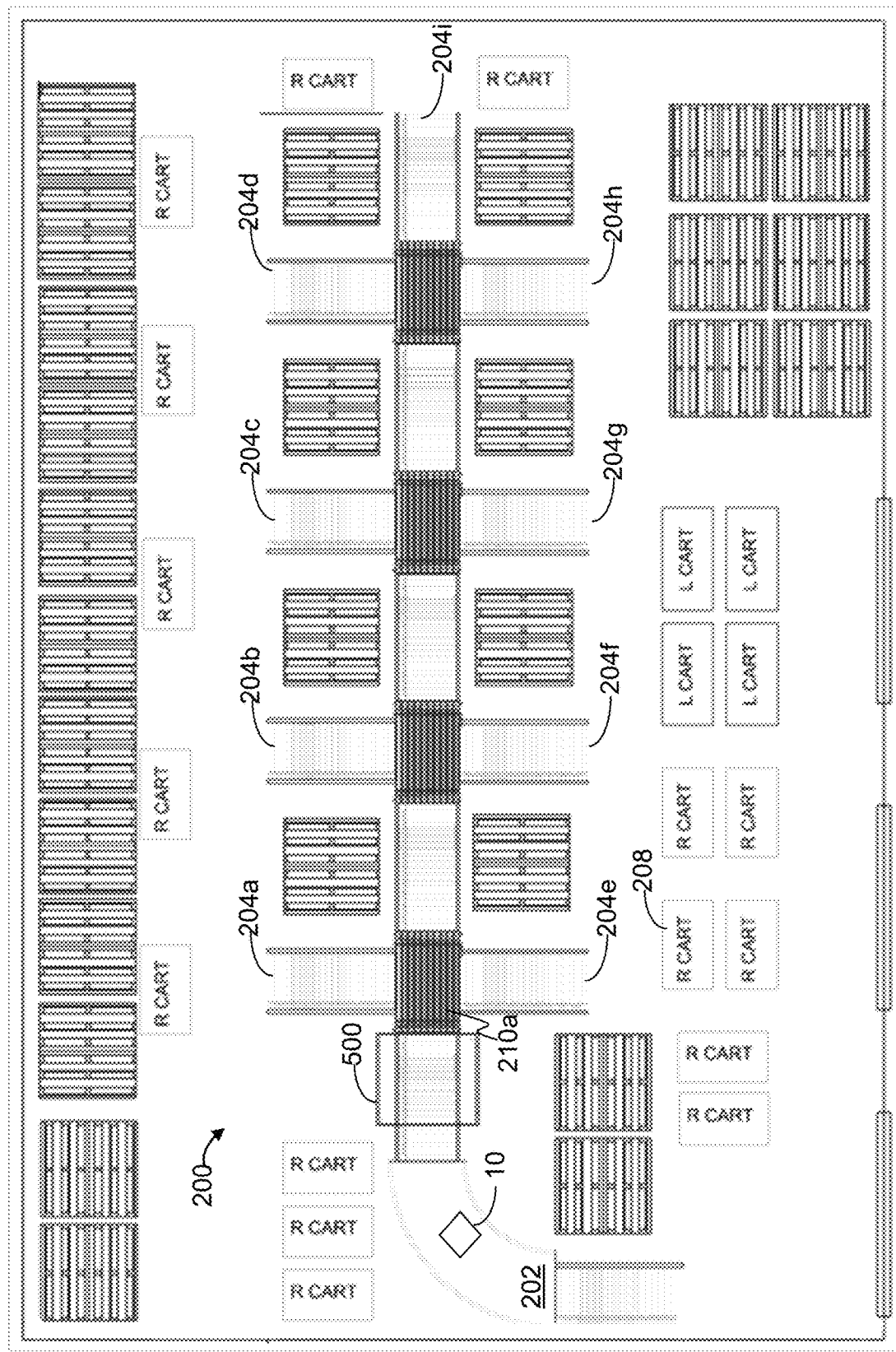
FIG. 2 is a schematic diagram depicting a material transporter, according to an embodiment.

FIG. 2 is a schematic view of an arrangement of a material transporter 200 according to an embodiment. In embodiments, material transporter 200 can be a conveyor system, having an inlet pathway 202 and a plurality of output lanes 204a-i. Cases 10 of product can be loaded onto inlet pathway 202 and proceed through scanner 500 for identification. Each case 10 is then routed to the appropriate output land 204a-i by one or more sort modules 210. In embodiments, material transporter 200 can be modular, such that the various components can be broken down for storage between shipments. In embodiments, material transporter 200 can be any material moving system, including belt conveyors, roller conveyors, cranes, or vehicles.

Each lane 204 can terminate in the vicinity of one or more bins 206, which can be secondary sort containers such as carts or pallets. Each bin 206 can be labeled to enable identification of the destination of the bin. In some embodiments, bins 206 can have permanent labels. In other embodiments, bins 206 can have temporary labels such as chalk or dry erase boards, or preprinted magnetic labels. In still other embodiments, bins 206 can comprise dynamic labels such as display screens or LED displays such that the destination of each bin 206 can be modified by components of controller 100 or other control systems.

The configuration of material transporter 200 depicted in FIG. 2 is just one example of a possible configuration of a material transporter. In embodiments, material transporter 200 may have more or fewer lanes 204, or sort modules 210. The various components of material transporter 200 can be similar to those depicted and described in U.S. Patent Pub. No. 2017/0330135A1 to Taylor et al., the disclosure of which is hereby incorporated by reference. In embodiments, a transporter configuration 212 can be provided to controller 400 for use in the sorting process.

Figure 3:
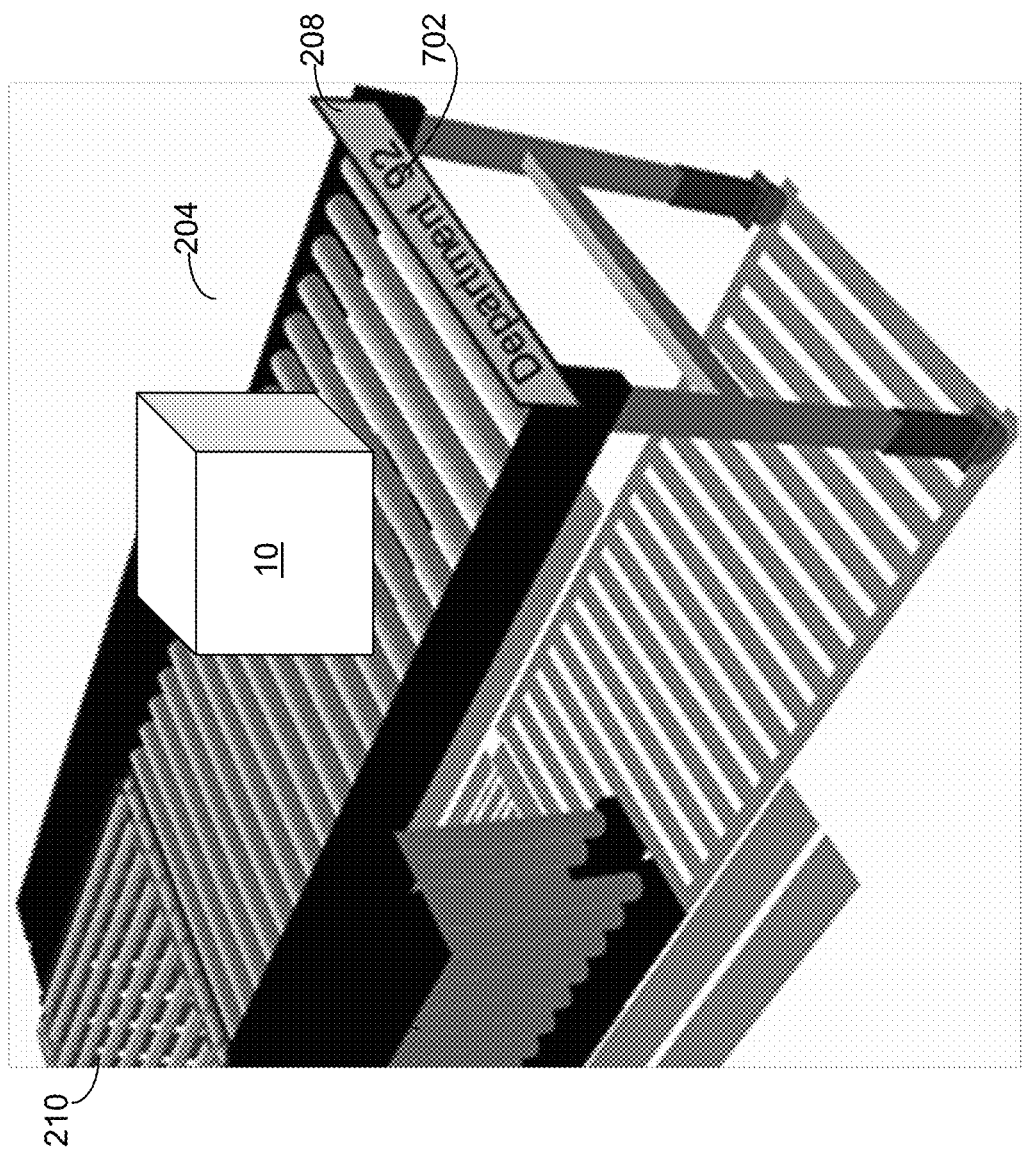
FIG. 3 is a perspective view of an outlet lane, according to an embodiment.

FIG. 3 is a perspective view depicting an indicator 208 of a lane 204 according to an embodiment. Indicator 208 is configured to provide a notification 702, produced by notification engine 700 or other component of system 100, to an unloader stationed at lane 204. In embodiments, notifications 702 can be provided when a case 10 is received at lane 204. In embodiments, lane 204, sort modules 210, or other elements of material transporter 200 can include means such as scanners, photo-eyes, weight scales, or other sensors to detect the arrival of a case 10 at lane 204. In embodiments, such means can enable notification engine 700 to determine the case identifier of case 10.

In embodiments, indicator 208 can comprise a display screen, as depicted. Those of ordinary skill in the art will appreciate that other means of providing indications to unloaders can be provided. For example, in embodiments, indicator 208 can comprise audio indicators over headphones, directed speakers, loud speakers, or other audio devices. Where indicator 208 comprises localized audio, audio indications can be specific to the current lane. Where indicator 208 comprises broadcast audio, such as loud speakers, audio indications can include a lane identifier. Indicator 208 can comprise other visual displays such as LED matrices. Indicator 208 can also comprise one or more projection devices configured to project a light, color, or other indication onto one or more projections onto the case 10, or an associated bin 206. In embodiments, indicator 208 can comprise a light source such as an LED, strobe, or other illuminating device on associated bin 206. In still other embodiments, indicator 208 can comprise or include an augmented reality (AR) device.

In embodiments, notifications 702 can comprise one or more messages indicating a destination for the contents of case 10. In embodiments, notifications 702 can also comprise instructions for handling of the contents of case 10 such as safety warnings. For example, heavy items requiring a team lift may be indicated via a notification 702 in embodiments. Notifications 702 can further comprise instructions for breaking case 10 down into groups of one or more units with disparate final locations (for example, 10 units to department 92 and 15 units to storage). Notifications 702 can also comprise performance feedback, including incentives. For example, where indicator 208 includes audio devices, music of the unloaders choice may be played when the unloader is removing items at a minimum rate. In embodiments, notifications 702 can include an indication that the current lane is complete, and no more cases will be assigned to that lane, enabling the unloader to proceed to other duties. In embodiments, notifications 702 can include an indication that a neighboring lane requires assistance with a team lift, enabling the unloader to provide the assistance without the need for direct communication between unloaders.

Figure 4:
FIG. 4 is a set of photographic views of bar codes for use with embodiments.

In embodiments, scanner 300 (FIG. 1) is arranged along material transporter 200 in order to determine a case identifier 14 from each case 10. Case identifiers 14 can be presented in the form of barcodes, such as those depicted in FIG. 4, two-dimensional quick response codes (QR codes) or radio frequency identifier (RFID) tags, machine readable text, or some other form readable by scanner 300. In embodiments, scanner 300 can be an optical scan tunnel comprising a line-based scanner, capable of scanning bar codes of at least one inch, with a minimum bar thickness of about 20 mil. In embodiments, scanner 300 can require a quiet zone of at least about 0.25 inches around a Code 128 compliant barcode of grade A or B. In embodiments, scanner 300 can comprise an optical sensor and be configured to determine a case identifier 14 from the physical configuration of the box (such as length, height, color, or other identifying markings). In embodiments, scanner 300 can comprise a combination of sensor types described above, as well as others known in the art such as pressure sensors. In embodiments, scanner 300 can be a handheld optical or RFID scanner, or a keyboard for manual entry of case identifier 14 by an operator.

Various components of system 100 can comprise software engines, or engines including both hardware and software components. In embodiments, these components can be arranged to execute on, or in association with, controller 400 as depicted in FIG. 1. Controller 400 can comprise a single computing system including a non-volatile memory, and a processor, in embodiments. In embodiments, the various components of controller 400 discussed below can be present on multiple operably coupled computing systems.

Controller 400 can comprise user interface 402, enabling an operator (not shown) to interact with system 100 in order to monitor operation and/or to provide configuration or other inputs. User interface 402 can comprise a graphical user interface (GUI), command-line interface, and/or a programmatic interface such as an application programming interface (API) enabling programmatic control.

Controller 400 can further comprise data interface 404, configured to receive necessary data inputs and store processed data outputs as needed. Data interface 404 can comprise one or more wired or wireless network 12, or other communication connections between controller 400 and one or more local and/or remote data stores, in embodiments. In embodiments, data interface 404 can comprise local data input and/or output means such as data contained on removable or fixed media, or manual entry via keyboard or mouse. In embodiments, data interface 404 can poll for data and/or can present an interface enabling data to be pushed to data interface 404 by external tools. In embodiments, data transfers can be performed randomly, as needed, and/or data interface 404 can poll for data at scheduled intervals. In embodiments data interface 404 can communicate with a remote, or cloud, data store on a regularly scheduled basis in order to retrieve needed data files, and to provide updated data. In embodiments, data interface 404 can receive data files in flat formats, database formats, or any other data storage format.

Invoice processor 500 is configured to receive data inputs 502 regarding expected product shipments in embodiments. Data inputs 502 can include invoice information 502*a*, item dimension information 502*b*, case pack information 502*c*, vendor pack information 502*d*, and sortation criteria 502*e*. Data inputs 502 can be received via data interface 404 from a variety of sources, including product databases, vendor databases, store inventory databases 902, and supply chain databases 802.

Invoice information 502*a* can comprise data elements including invoice data regarding expected shipments. In embodiments, invoice product information 502*a* can comprise a case identifier (such as a distribution center label number), an order type, a delivery quantity (in cases, or units), one or more item numbers, one or more item descriptions, a universal product code (UPC) number for the individual units, a UPC number for the warehouse packaged case, an accounting department number, and an indication of conveyability. In embodiments invoice information 502*a* can be received from an upstream supply chain data source, such as an invoice or shipping manifest database. In embodiments, invoice information 502*a* can be updated on a shipment-by-shipment basis.

Item dimension information 502*b* can comprise data elements describing the attributes of individual units of items of a given item number. In embodiments, item dimension information 502*b* can include the item length, item width, item height, item weight, and codes indicating the units of measure for the size and weight measurements. In embodiments item dimension information 502*b* can be received from an upstream supply chain data source, such as an invoice or shipping manifest database, a vendor database, or a manufacturer database. In embodiments, item dimension information 502*b* can be relatively static, and updated only as needed. In embodiments, item dimension information 502*b* can be updated on a shipment-by-shipment basis.

Vendor pack information 502*c* can comprise data elements describing how units of items or a given item number are packaged by a vendor, or other intermediate shipper. In embodiments, vendor pack information 502*c* can include the quantity of units in each vendor pack, in addition to the vendor pack length, width, height and weight, and codes indicating the units of measure for the size and weight measurements. In embodiments vendor pack information 502*c* can be received from an upstream supply chain data source, such as an invoice or shipping manifest database, or a vendor database. In embodiments, vendor pack information 502*c* can be relatively static, and updated only as needed. In embodiments, vendor pack information 502*c* can be updated on a shipment-by-shipment basis.

Warehouse (or case) pack information 502d can comprise data elements describing how the vendor packaged items of a given item number are further packaged at a warehouse or distribution center into cases 10 for shipment. In embodiments, case pack information 502d can include the quantity of vendor packs in each case, in addition to the case pack length, width, height and weight, and codes indicating the units of measure for the size and weight measurements. In embodiments case pack information 502d can be received from an upstream supply chain data source, such as an invoice or shipping manifest database, or a vendor database. In embodiments, case pack information 502d can be updated on a shipment-by-shipment basis.

Sortation criteria 502e can comprise data elements describing store needs and destination locations for given item numbers. Sortation criteria 502e can include a department category for the item, an aisle location category, an on hand category, a shelf capacity category, and a sales floor demand category. Sortation criteria 502e can further including marketing data, indicating, for example, whether certain item numbers are currently on display in an end cap, seasonal, or other feature location, or will be needed in a feature location at a later date. Sortation criteria 502e can be store or receiving location specific. Sortation criteria 502e can be received from store inventory databases 902.

In one embodiment, sortation criteria 502 can be determined based on input from one or more users. User interface 402, or other interfaces of system 100 can present one or more screens enabling a user to modify sortation criteria 502 based on current needs. For example, a user can specify a special destination 506 to assemble cases for a special customer order. This can be helpful where a customer orders a large quantity (for example a full case or pallet) of a good. It may be desirable to leave a case intact and deliver it to a designated pick up area. A screen can enable the user to designate marketing data, such as feature locations which may be specific for a given retail site on a given date. Sortation criteria 502e provided by a user can be stored in and retrieved from store inventory database 902.

Sortation criteria 502 can further be determined based on real-time sales data. For example, the appropriate sales floor demand category can be determined at least in part based on whether there is a potential for missed sales of a product. In one embodiment, missed sales for a given item can be detected based on an average time between sales for the item in the store. This average can be adjusted for time of day, season, or other factors as appropriate. Missed sales can be detected if the time since the last sale of the item is higher than the average time between sales. Therefore, the sales floor demand category can be more critical when a longer time period has elapsed between sales. Sales data can be received from one or more On Shelf Customer Availability (OSCA) or other data sources.

Figure 5A:
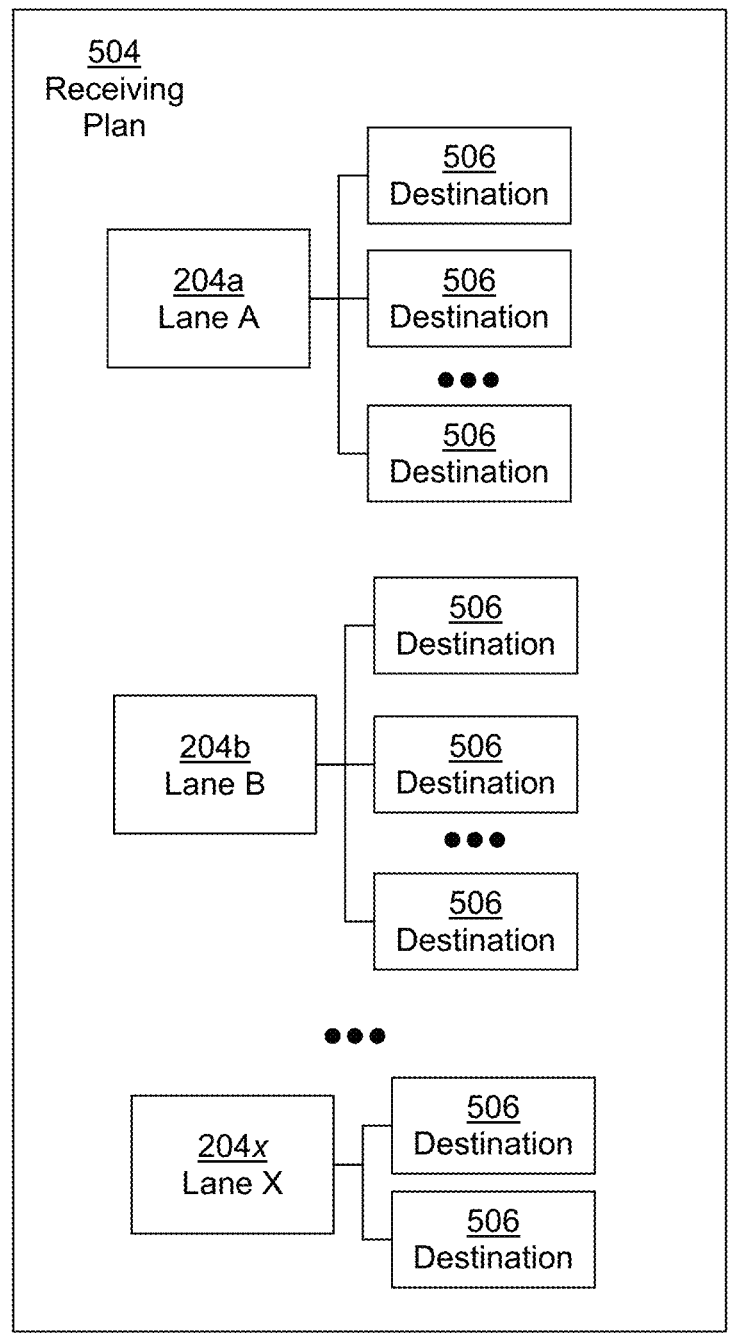
FIG. 5A is a block diagram depicting data elements of a receiving plan, according to an embodiment.
Figure 5B:
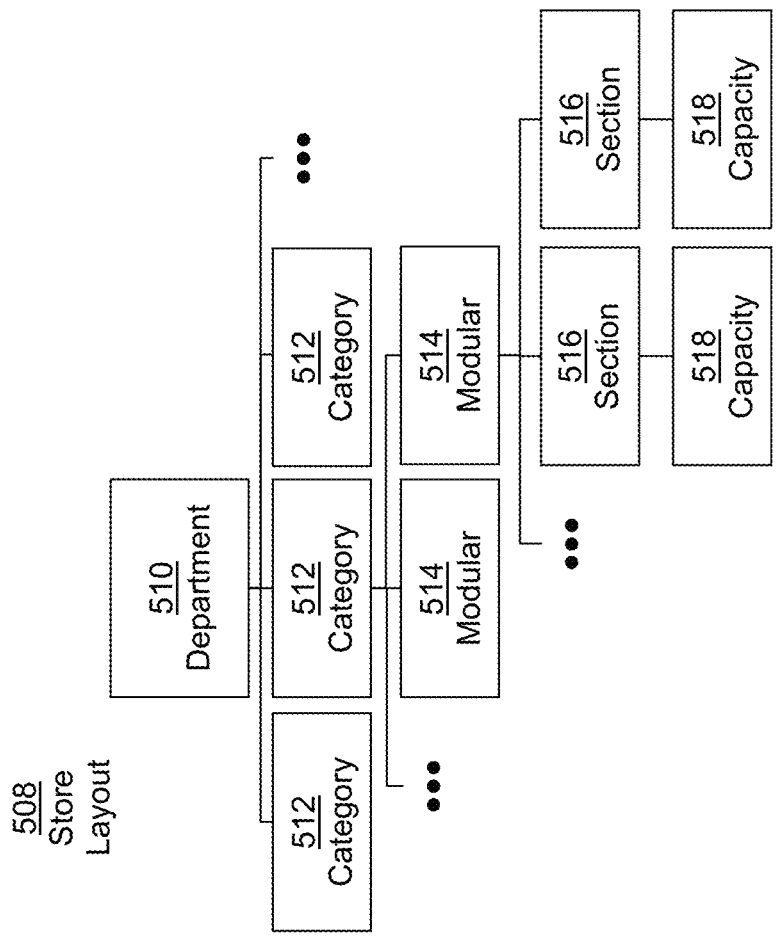
FIG. 5B is a block diagram depicting a structure of a store layout, according to an embodiment.

FIG. 5A depicts a structure of a receiving plan 504 according to embodiments. In embodiments, invoice processor 500 can use data inputs 502 to generate receiving plan 504 for each expected shipment. In embodiments, receiving plan 504 can assign one or more destinations 506 to each lane 204 of material transporter 200. In embodiments, each destination 506 can in turn be assigned to one or more lanes 204 in order to provide load balancing. FIG. 5B depicts a structure of a store layout, 508 according to an embodiment. Store layout 508 can comprise one or more departments 510, for example grocery, sporting goods, or clothing. Each department 510 can comprise one or more categories 512, for example a grocery department can comprise dairy, baking needs, and deli. Each category 512 can comprise one or more modulars 514, each comprising one or more sections 516. Each section 516 can have a capacity 518 for each item type. Other store layout hierarchies or other structures can be provided. Each destination 506 assigned to lanes 204 can be at any level of store layout 510 in embodiments. In embodiments each destination 506 is a specific section category 512, within a department 510. In embodiments, destinations 506 can be further designated as standard, feature, future planning, or storage destinations, though more, fewer, or alternate destination types can be provided. Data representing store layout 508 can be stored within invoice processor 500, or retrieved via data interface 404.

Each destination 506 can further comprise a priority level, based on store layout 508 and sortation criteria 502e in embodiments. Routing determinations for each case 10 can therefore incorporate destination priority levels and capacity. In embodiments, any destination for which a sales floor demand value in sortation criteria 502e is critical can have the highest priority. In embodiments, standard destinations can have the next highest priority, followed by feature destinations, future planning destinations, and storage destinations in descending order. Other orderings of priority levels can be used in embodiments.

Figure 6:
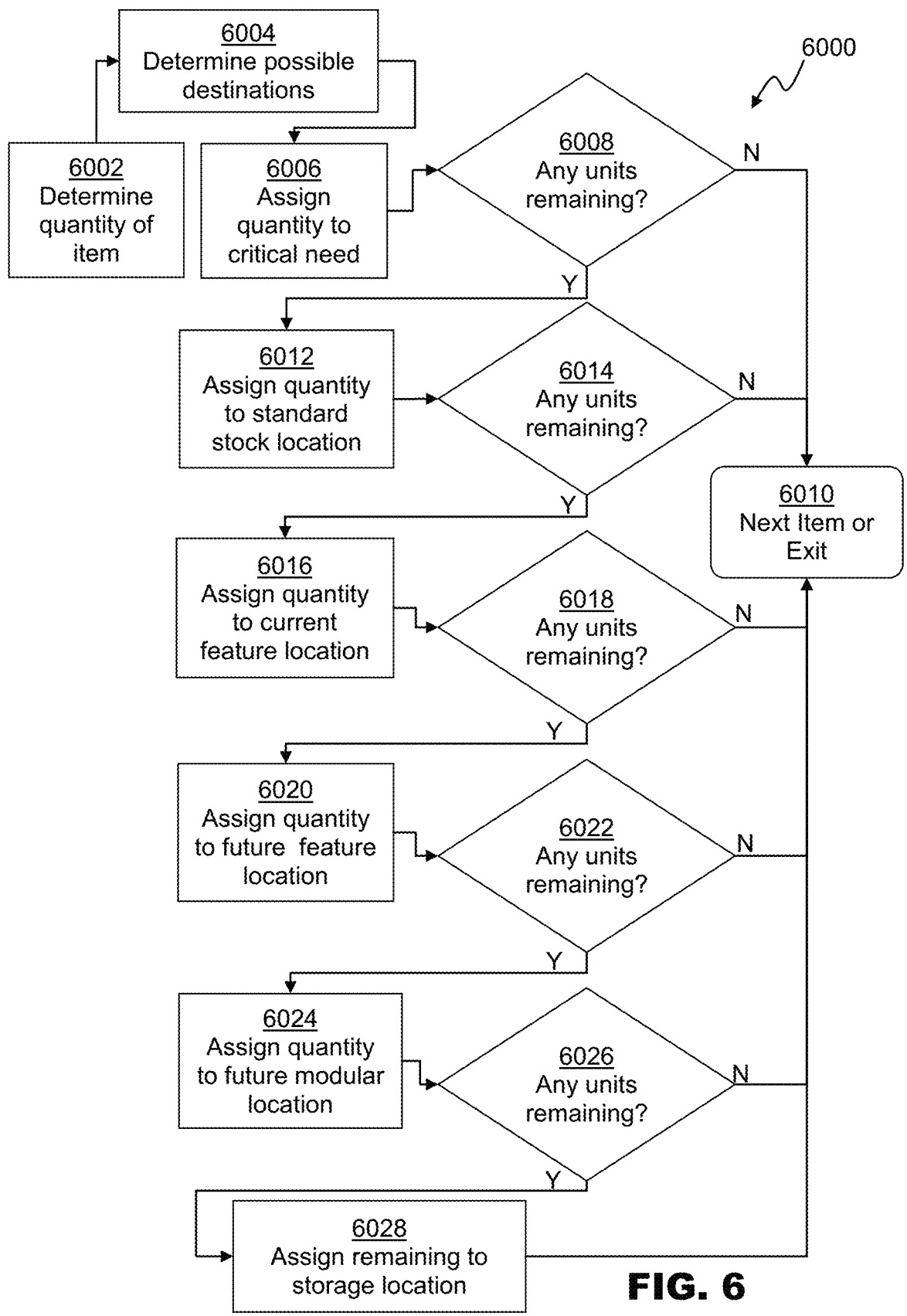
FIG. 6 is a flowchart depicting a method for generating a receiving plan, according to an embodiment.

FIG. 6 is a flowchart depicting an embodiment of a method 6000 than can be used to determine which destinations 506 will be receiving expected cases 10. In embodiments, method 6000 can be performed by invoice processor 500. In embodiments, method 6000 can be performed by other components of system 100, or receiving plan 504 can be provided to system 100 manually. At 6002, invoice information 502a, vendor pack information 502c, and case pack information 502d can be used to determine the number of units of an item that are expected in a shipment. At 6004 store layout 508 can be used to determine possible destinations for the item. Sorting criteria 502e, including sales floor demand, and marketing data can be used determine the priority and capacities at each possible destination. At 6006, units can be assigned to fill any destinations for which the sales floor demand indicates a critical need. If, at 6008, all units of the item have been assigned, execution proceeds to the next item or exits if no more items remain at 6010.

If units remain, at 6012 units can be assigned to fill any standard stock destinations. If, at 6014, all units of the item have been assigned, execution proceeds to the next item or exits if no more items remain at 6010.

If units remain, at 6016 units can be assigned to fill any current feature destinations. If, at 6018, all units of the item have been assigned, execution proceeds to the next item or exits if no more items remain at 6010.

If units remain, at 6020 units can be assigned to fill any future feature destinations. If, at 6022, all units of the item have been assigned, execution proceeds to the next item or exits if no more items remain at 6010.

If units remain, at 6024 units can be assigned to fill any future modular destinations. If, at 6026, all units of the item have been assigned, execution proceeds to the next item or exits if no more items remain at 6010.

At 6028, any remaining units can be assigned to a storage location, and execution proceeds to the next item or exits if no more items remain at 6010.

Receiving plan 504 can then be generated based on the number of cases 10 of all items assigned to a given destination 506 in the expected shipment. In embodiments, receiving plan 504 may be load balanced, in order to increase the likelihood that each lane 204 will receive an approximately equal number of cases 10 in the expected shipment. In embodiments, receiving plan 504 may be also load balanced based on the time involved to unload each type of case. Other criteria for load balancing can also be used. In embodiments, destinations 506 expected to receive cases 10 including large or heavy items can be assigned to lanes 204 that are most distal in relation to inlet 202.

Invoice processor 500 can generate a report including receiving plan 504 for viewing by an operator, such as a receiving manager, in embodiments. Receiving plan 504 can enable the operator to label and/or arrange the appropriate types and numbers of bins 208 at each receiving lane. In embodiments, receiving plan 504 can be used to modify a label, screen, or other indicator on bins 208 previously arranged at one or more lanes 204.

Sorting engine 600 is configured to determine a destination and associated notification to provide to an unloader for each received case as it is scanned by scanner 300 and arrives at lane 204 in embodiments. In embodiments, each case can be assigned to the highest priority destination 506 that has space for items within the case 10. Sorting engine 600 can then route each case 10 to the appropriate lane 204. In embodiments, sorting engine 600 can provide one or more notifications 702 to notification engine 700 based on the destination and contents of each case. In embodiments, notifications 702 can include a safety warning, for example where the case or items contained within will require a team lift. In embodiments, notifications 702 can include a destination for the full contents of the case, or a list of destinations with quantities for each.

Figure 7:
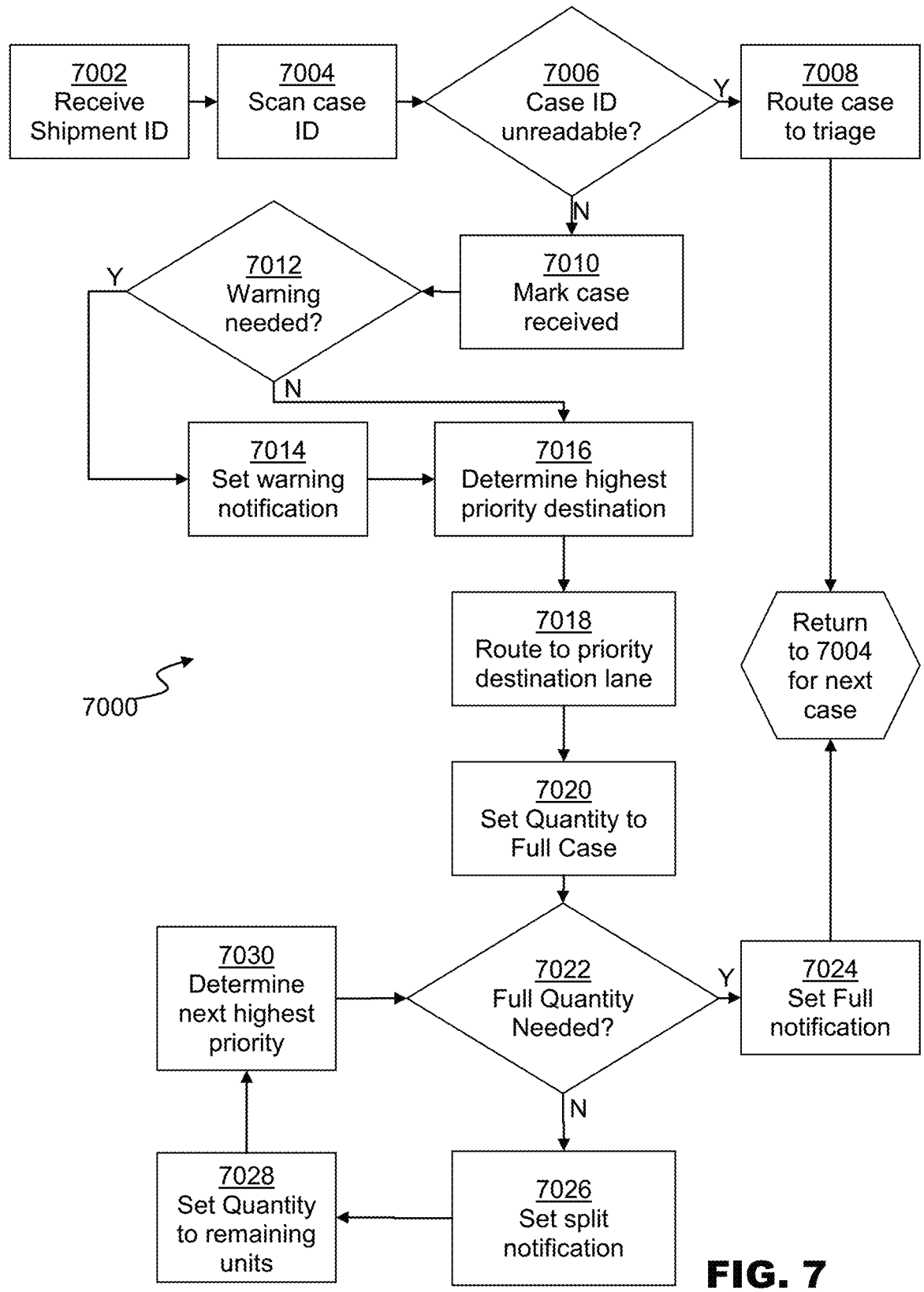
FIG. 7 is a flowchart depicting a method for determining destinations and notifications for a received case, according to an embodiment.

FIG. 7 depicts an embodiment of a method 7000 for routing and received cases 10 and providing notifications after a shipment arrives. When the shipment arrives a shipment identifier 7002 is received, enabling correlation with invoice information 502a, which may be preloaded, or retrieved as needed via data interface 404. As each case 10, is encountered by the scanner, the case identifier is retrieved if possible at 7004. If at 7006, no case identifier is readable, the case is routed to a triage destination 7008 or otherwise flagged, and control returns to 7004 for the next case. If the case identifier is successfully read at 7010, at 7012 a determination is made regarding a safety warning, which is set at 7014.

At 7016, the highest priority destination that has a need for units of the items within the case is determined. For example, as discussed above, if a destination has a critical need for the item, it may be selected, if not, a standard, feature, future, or storage destination may be selected. At 7018, the case is routed via the material transporter 200 to a lane 204 assigned to the selected destination. As discussed above, each destination 506 can be assigned to multiple lanes, in embodiments. In embodiments, the lane 204 may be selected based on, in part, the current status of the possible lane choices. For example, if a bottleneck or other backup exists at a given lane, for example 204a, a different lane, 204b, also having destination 506 could be selected. In embodiments, the lane may be selected based on, in part, the other destinations assigned to that lane. For example, where a given item is needed in multiple destinations, a lane that has more of the relevant destinations for the item assigned may be selected instead of a lane having only the highest priority destination assigned, in embodiments.

In embodiments, the remaining capacity at each destination 506 can be used to determine the content of further notifications 702. At 7020, the initial item quantity of the case can be assigned to the full per case item quantity as determined from data inputs 502. At 7022, if the current priority destination requires the full quantity, a notification 702 can instruct the unloader to place the full case into bin 208 for the priority destination 506 at 7024. If the priority destination does not require the full quantity, one or more split notifications 702 may be needed. In embodiments, the assignment of each unit to each destination can be stored for use by store inventory reconciler 900.

At 7026, a notification 702 instruction the unloader to place the quantity of units required at the current priority destination is generated. At 7028, the quantity can be set to the number of units remaining in the case. At 7030, the next highest priority destination can be determined, and at 7022, and notifications generated based on the quantity needed at destination 506 and remaining to be allocated from case 10. In embodiments, the lowest priority destinations (for example, storage destinations can always receive the remaining quantity).

After each case 10 has been full allocated, generated notifications 702 can be queued by notification engine 700 for presentation to the unloader when the case 10 arrives at the assigned lane. Control can then return to 7004 for the next received case, until all cases in the shipment have been received.

In embodiments, system 100 can optionally include supply chain reconciler 800 and store inventory reconciler 900. In embodiments, supply chain reconciler 800 can compare invoice data 502a to the set of cases 10 actually received. In embodiments, supply chain reconciler 800 can detect shortages (expected units not received) or overages (unexpected units received) for each shipment. In embodiments, supply chain reconciler 800 can generate a report of shortages and overages for review by the operator, such as a receiving manager. In embodiments, supply chain reconciler 800 can provide shortages and overages to upstream supply chain databases 802 via data interface 404. In embodiments, supply chain reconciler 800 can modify invoice data 502a at upstream supply chain databases 802 in order to correct for the actually received shipment. In embodiments, supply chain reconciler 800 can generate a finalized invoice based on invoice data 502a and the actual units received.

In embodiments, store inventory reconciler 900 can update store inventory database 902 based on the cases actually received in each shipment. In embodiments, store inventory database 902 can be initially updated based on invoice information 502a when each shipment arrives. In embodiments, store inventory reconciler 900 can further modify store inventory database 902 as each case 10 is scanned, as each unit is allocated to a destination, or when all cases in the shipment have been processed.

Figure 8A:
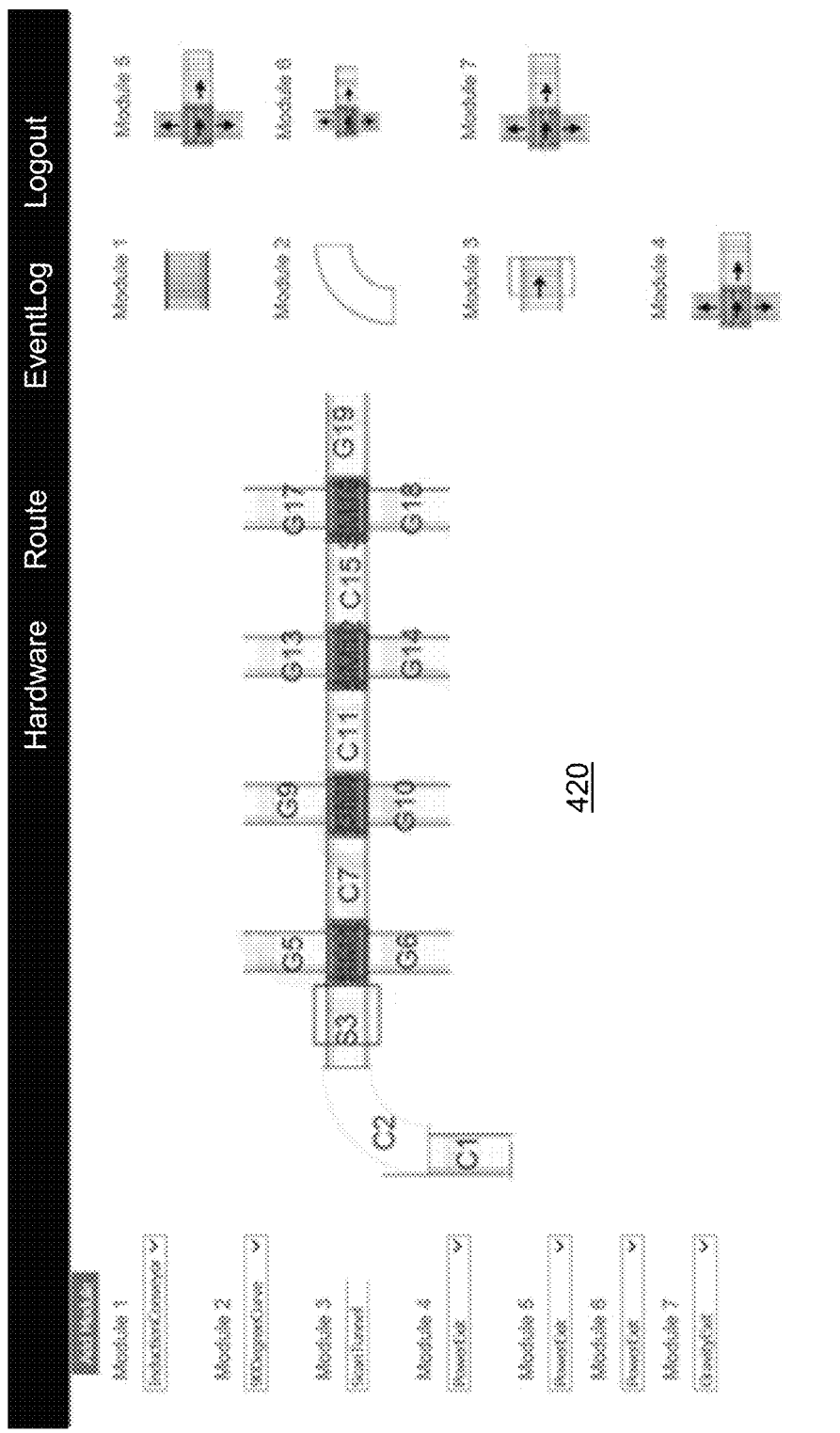
FIG. 8A is a screen shot depicting a configuration screen, according to an embodiment.
Figure 8B:
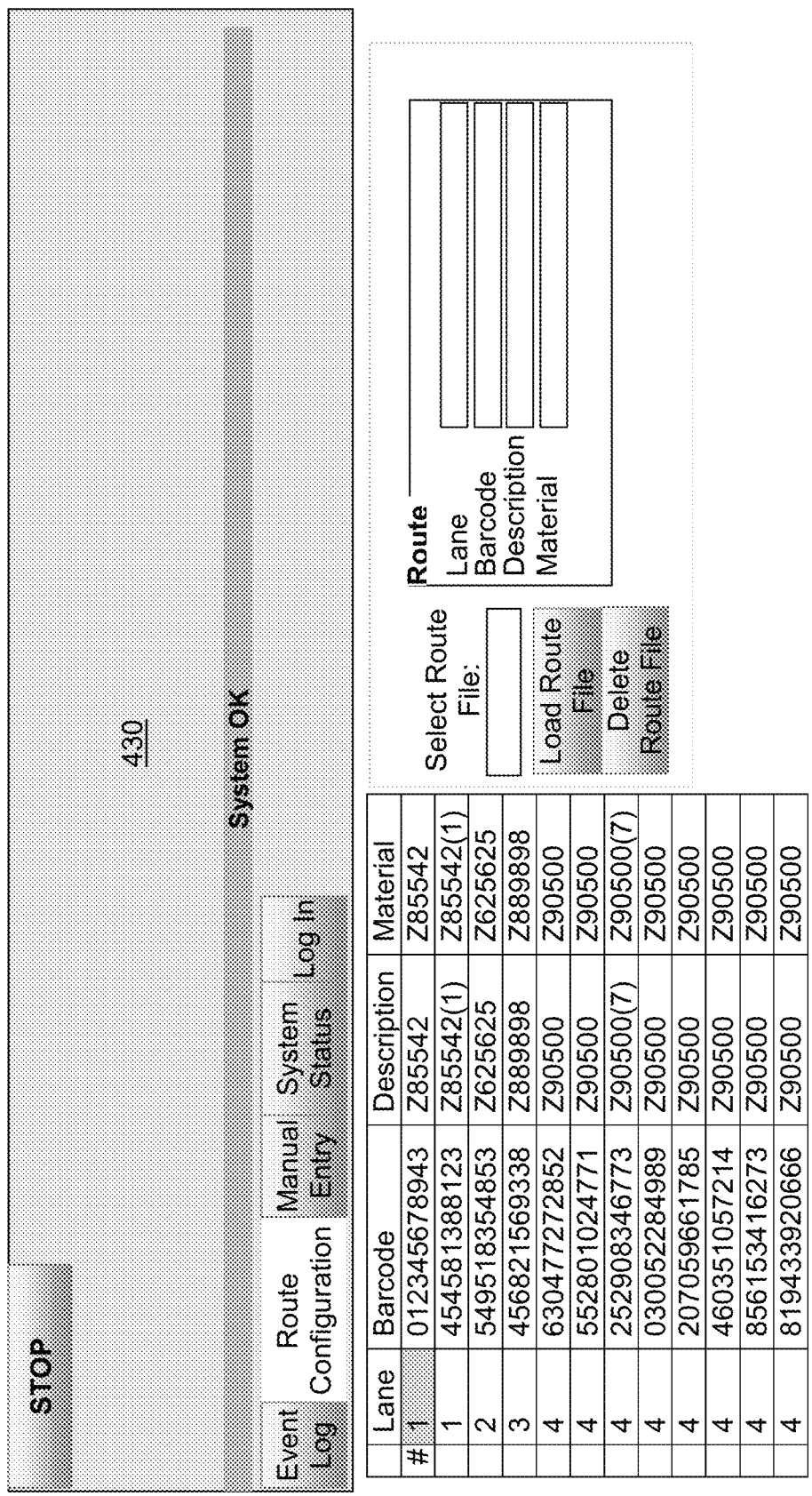
FIG. 8B is a screen shot depicting a configuration screen, according to an embodiment.

In embodiments, user interface 402 can present a GUI or web-based interface for providing configuration information to system 100, as depicted in FIGS. 8A-8D. FIG. 8A depicts a screen 420 of an embodiment of user interface 402 enabling an operator to specify the current configuration of material transporter 200. As depicted in the example of FIG. 8A, material transporter 200 is a modular conveyor system, including one scan tunnel S3, four sortation modules SM4, SM8, SM12, and SM16, and lanes G5, G6, G9, G10, G13, G14, G17, G18 and G19. FIG. 8B depicts a screen 430 of an embodiment of user interface 402 enabling an operator to view and modify a generated or provided receiving plan 504.

Figure 8C:
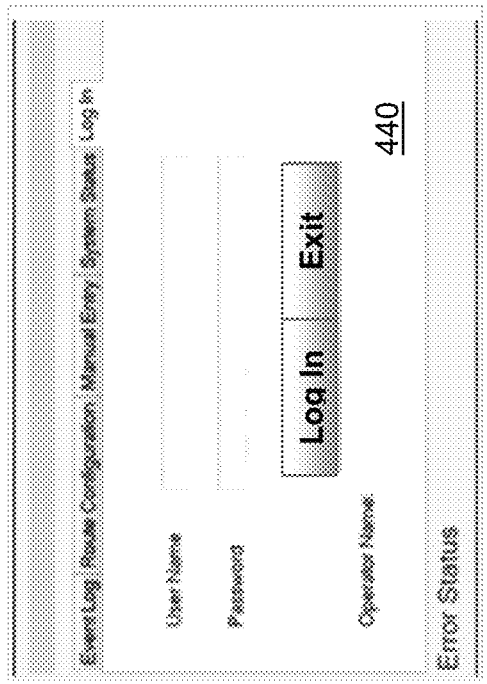
FIG. 8C is a screen shot depicting a user login screen, according to an embodiment.
Figure 8D:
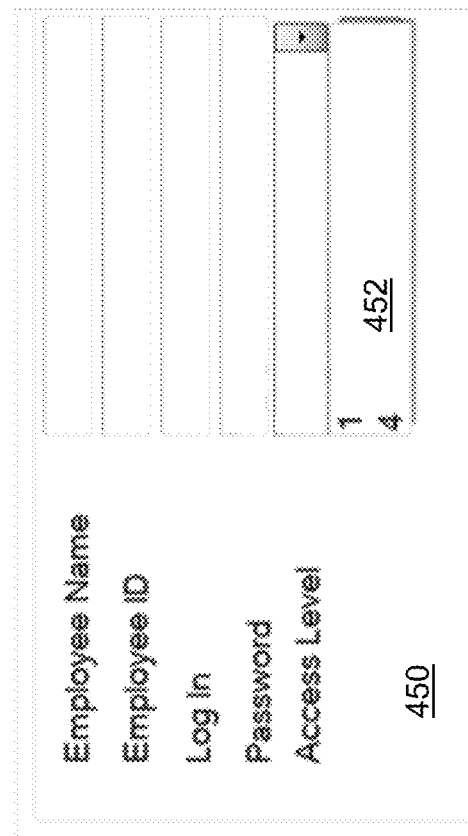
FIG. 8D is a screen shot depicting a user account setup screen, according to an embodiment.

In embodiments, controller 400 can provide restricted user access, such that configuration and operation information can only be viewed or modified through user interface 402 by authorized users. FIG. 8C depicts a screen 440 of an embodiment of user interface 402 enabling an operator to login with a username and password. FIG. 8D depicts a screen 450 of an embodiment of user interface 402 enabling an operator to create or modify user accounts, including setting access levels 452. In embodiments, users of a high access level, for example, level 1 can be presented with screens permitting editing of configuration settings, including user accounts. In embodiments, users of a low access level, for example, level 4, can be presented with screens allowing only viewing of configuration and operation information without modification. In embodiments, other access levels and security schemes such as those known in the art can be used. In embodiments, user authentication can be performed via external systems such as OAuth, lightweight directory access protocol (LDAP) or other single sign-on or user authentication services.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

In one embodiment, the shipment receiving system 100 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field-10 programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A shipment receiving system for managing routing of one or more received cases from a shipment of one or more expected cases to one or more destinations, each of the one or more received cases and the one or more expected cases containing one or more items of a product type, the system comprising:
   a material transporter having at least one inlet pathway and a plurality of outlet lanes, each outlet lane comprising an indicator, the material transporter configured to move a received case to one of the plurality of outlet lanes based on a received direction;
   a notification engine configured to provide notifications to the indicator of one or more of the plurality of outlet lanes;
   an invoice processor configured to:
      receive invoice data including the product type of each of the one or more expected cases,
      receive current inventory management data including a quantity and location of items of each product type in the invoice data,
      receive marketing data for each product type in the invoice data,
      determine an expected destination of each one of the expected cases based on the invoice data, the current inventory management data, and the marketing data,
      assign one or more of the plurality of lanes to each expected destination based on the number of expected cases with the expected destination, and
      store a receiving plan for the shipment including the one or more lanes assigned to each expected destination;
   a scanner comprising a sensor for detecting a case identifier of each individual one of the one or more received cases;
   a sorting engine, operably coupled to the material transporter, the scanner, the invoice processor, and the notification engine, and configured to:
      receive the case identifier of an individual received case from the scanner,
      store a receipt indication for the received case,
      associate the received case with an expected case in the invoice data,
      determine the destination of the received case, based on the invoice data, the current inventory management data, the marketing data, and the stored receipt indications;
      assign the received case to one of the one or more lanes assigned to the destination of the received case,
      direct the material transporter to route the received case to the lane assigned to the received case, and
      direct the notification engine to provide a notification to the indicator of the lane assigned to the received case when the received case arrives at an unloading portion of the lane, the notification providing information regarding the received case to an unloader.

2. The system of claim 1, wherein the notification comprises one or more of: the destination assigned to the received case, a lane complete notice, and a safety warning.

3. The system of claim 2, wherein the safety warning indicates that the case will require a team-lift.

4. The system of claim 1, further comprising:
   an inventory reconciler operably coupled to the invoice processor and the sorting engine and configured to:
      update the current inventory management data based on case identifier of each of the one or more received cases.

5. The system of claim 1, further comprising:
   an supply chain reconciler operably coupled to the invoice processor and the sorting engine and configured to:
      generate a finalized invoice based on the case identifier of each of the one or more received cases, and
      produce a report indicating any discrepancies between the one or more expected cases and the one or more receive cases.

6. The system of claim 1, wherein the material transporter comprises a conveyor system.

7. The system of claim 1, wherein the scanner comprises an optical scanner and the case identifier is determined based on a visual attribute of the received case selected from the group including: a bar code, a QR-code, machine-readable text, and the visual configuration of the received case.

8. The system of claim 1, wherein the scanner comprises a radio-frequency identifier reader and the case identifier is determined based on one or more radio-frequency identifiers on or within the received case.

9. The system of claim 1, wherein the indicator comprises a visual display device selected from the group including: a display screen integrated with the lane, one or more lighting elements integrated with the lane, and a projection on the received case.

10. The system of claim 1, wherein the indicator comprises an audio output device selected from the group including: directional speakers, loudspeakers, and headphones.

11. The system of claim 1, wherein the invoice processor is further configured to assign one or more bins to each destination and to provide an output directing the placement of one or more bins at each lane based on the destinations assigned to the lane.

12. The system of claim 11, wherein each of the one or more bins comprises a display configured to indicate the destination that the bin is assigned to.

13. The system of claim 1, wherein each of the one or more destinations is selected from the group including: a critical stock location, a standard stock location, a feature stock location, a future planning location, a storage location and a triage location.

14. The system of claim 13, wherein the sorting engine determines the destination of the received case by:
   determining a triage location if a destination for the received case cannot be determined;
   determining a critical stock location if the current inventory information and the stored receipt indications indicate that there is an urgent need for the product type of the received case at a standard stock location or a feature stock location;

determining a standard stock location if the current inventory information and the stored receipt indications indicate that there is space for a case of the product type of the received case at the standard stock location;

determining a feature stock location if the marketing data indicates that the product type of the received case is featured and the current inventory information and the stored receipt indications indicate that there is space for a case of the product type of the received case at the feature stock location; and determining a future feature location if the marketing data indicates that the product type of the received case is featured and current inventory information and the stored receipt indications indicate that there is no space for a case of the product type of the received case at a feature stock location.

15. A method for routing one or more received cases, each of the one or more received cases containing one or items of a product type, from a shipment of one or more expected cases to one or more destinations, the method comprising:
receiving invoice data including the product type of each of the one or more expected cases;
receiving current inventory management data including a quantity and location of items of each product type in the invoice data;
receiving marketing data for each product type in the invoice data;
determining an expected destination of each one of the expected cases based on the invoice data, the current inventory management data, and the marketing data;
assigning one or more lanes to each expected destination based on the number of expected cases with the expected destination;
storing a receiving plan for the shipment including the one or more lanes assigned to each expected destination;
scanning, with a sensor, each of the one or more received cases to determine a case identifier;
storing a receipt indication for the received case;
associating the received case with an expected case in the invoice data;
determining the destination of the received case, based on the invoice data, the current inventory management data, the marketing data, and the stored receipt indications;
assigning the received case to one of the one or more lanes assigned to the destination of the received case;
directing the received case to the lane assigned to the received case by a material transporter having at least one inlet pathway and a plurality of outlet lanes, each outlet lane comprising an indicator, the material transporter configured to move a received case to one of the plurality of outlet lanes based on a received direction;
providing information about the received case to an unloader when the received case arrives at an unloading portion of the lane assigned to the received case.

16. The method of claim 15, wherein the notification comprises one or more of:
the destination assigned to the received case, a lane complete notice, and a safety warning.

17. The method of claim 16, wherein the safety warning indicates that the case will require a team-lift.

18. The method of claim 15, further comprising:
updating the current inventory management data based on the product type of each of the one or more received cases.

19. The method of claim 16, further comprising:
generating a finalized invoice based on the product type of each of the one or more received cases, and
producing a report indicating any discrepancies between one or more expected cases and the one or more receive cases.

20. The method of claim 15, wherein scanning each of the one or more received cases to determine a case identifier comprises the case identifier within one or more of: a bar code, a QR-code, machine readable text, the visual configuration of the received case, or a radio-frequency identifier.

21. The method of claim 15, wherein providing an notification comprises presenting the notification on one or more of: a display screen integrated with the lane, one or more lighted elements integrated with the lane, a projection on the received case, directional speakers, loudspeakers, and headphones.

22. The method of claim 15, further comprising one or more bins to each destination and providing an output directing the placement of one or more bins at each lane based on the destinations assigned to the lane.

23. The method of claim 15, further comprising displaying the destination assigned to the bin on each of the one or more bins.

24. The method of claim 15, wherein each of the one or more destinations is selected from the group including: a critical stock location, a standard stock location, a feature stock location, a future planning location, a storage location and a triage location.

25. The method of claim 24, determining the destination of the received case comprises:
determining a triage location if the product type of the received case cannot be determined;
determining a critical stock location if the current inventory information indicates that there is an urgent need for the product type of the received case at a standard stock location or a feature stock location;
determining a standard stock location if the current inventory information indicates that there is space for a case of the product type of the received case at the standard stock location;
determining a feature stock location if the marketing data indicates that the product type of the received case is featured and the current inventory information indicates that there is space for a case of the product type of the received case at the feature stock location; and
determining a feature storage location if the marketing data indicates that the product type of the received case is featured and current inventory information indicates that there is no space for a case of the product type of the received case at a feature stock location.

* * * * *